United States Patent Office 3,697,242
Patented Oct. 10, 1972

3,697,242
STRENGTHENING BOROSILICATE GLASS BY CROWDING SURFACE LAYER WITH LiOH AND/OR KOH
Francis J. Shonebarger, Lancaster, Ohio, assignor to Anchor Hocking Corporation, Lancaster, Ohio
No Drawing. Filed Mar. 13, 1969, Ser. No. 807,071
Int. Cl. C03c 15/00; C03b 27/00
U.S. Cl. 65—30                                           18 Claims

ABSTRACT OF THE DISCLOSURE

Glass articles are strengthened by "crowding" or "stuffing" molecules of the hydroxide of lithium and/or potassium into a surface zone of the glass network. The crowding of the surface zone is accomplished by molecular migration rather than by ion exchange, and must be carried out at an elevated temperature which is below the strain point of the glass. The process is especially useful as a means of strengthening commercial borosilicate glasses which are generally difficult to strengthen significantly by ion exchange, and it can also be used to strengthen soda-lime and other glasses.

---

This invention relates to a method of strengthening glass articles by treatment with one or more alkali metal hydroxides, particularly potassium hydroxide (KOH) and lithium hydroxide (LiOH). The method is based upon the concept of crowding or stuffing the hydroxide molecules into the glass network, rather than upon exchange or replacement of ions of one type in the glass network by ions of another type from an external source.

Strengthening of glass articles by the new method results from molecular stuffing in a surface zone of the glass, whereby a compression stress is set up in the surface zone. This stress is retained by cooling without annealing, and remains in the final product.

Various other methods are known for strengthening glass articles by imparting or forming a compression stress in surface zones of the article. One such method is tempering, wherein the heated article is quickly chilled so that the outside portion of the article is cooled and "shrinks" before the interior, and a surface zone is thereby placed in compression as the inside cools and shrinks.

Another known method involves the substitution or exchange, in a surface zone, of smaller ions of an alkali metal from an external source for larger ions of a different alkali metal in the glass. Typically, lithium ions from a salt bath are exchanged for larger alkali metal ions such as sodium and/or potassium ions adjacent the surface of the glass article. As in tempering, a surface zone is developed which is in compression around the article, but in tempering such compression results from the fact that the surface composition is changed from that of the interior and, as changed, demonstrates a lower rate of thermal expansion than the interior.

U.S. Pat. No. 2,779,136 shows one method of strengthening by such lithium ion exchange technique. In that patent the article to be strengthened, containing replaceable sodium and/or potassium ions, is exposed to lithium ions at temperatures above the strain point, and sodium and/or potassium ions in or near the surface are partially replaced by lithium ions. Thus, that method turns on an exchange or replacement of the sodium or potassium ions by lithium ions. A lithium salt is required as the ion exchange medium.

Such replacement of ions in the glass with smaller ions from an external source will create a tension layer unless the article is treated above the strain release point, since the surface contains smaller ions after the exchange. Treating at temperatures above the strain release point relieves the tension zone at the surface by viscous flow. The compression layer is formed upon cooling after annealing.

Treatment at temperatures above the strain release point can lead to undesired deformation. Moreover, sudden exposure to the annealing temperature (often above 1000° F.) can lead to thermal shock, unless provision is made for gradual heat-up of the article to be treated. Heretofore, all known methods of strengthening glass involving the use of lithium compounds have proceeded by the mechanism of ion exchange, and hence have required temperatures above the strain release point.

Another method for strengthening, shown in U.S. Pat. No. 3,356,477 is based upon the exchange of ions (typically Na+) in the glass by larger potassium ions. In such processes ionized potassium salts are used as the source. The potassium ions, being larger, tend to create compression stress in the surface zone during exchange, and the process is carried out without annealing in order to avoid viscous flow sufficient to release the already established compresson.

All such ion exchange processes—whether ions in the glass surface are replaced by smaller ions or by larger ions—require that the ions in the glass surface be exchangeable ions. Soda-lime glasses contain replaceable sodium ions, and hence are commonly used as the glass to be strengthened. In general, however, the ion exchange processes do not achieve much strength improvement in glasses such as the commercial borosilicates that contain no or only a small portion of exchangeable sodium ions.

The present method of strengthening is carried out by an entirely different mechanism. Rather than the past technique of exchanging or replacing ions in the glass by other ions from an external source, according to this invention molecules of LiOH or KOH are diffused or migrated into the surface zone of the glass network without equal or counterbalancing ion exchange. The migration is not an exchange, but rather is an addition. The alkali metal hydroxide molecules migrating into the surface apparently do not in general move into voids created by the removal of original ions or molecules. As a result, alkali metal hydroxide molecules tend to stuff or crowd the region into which they migrate, thereby setting up the compression zone that strengthens the glass.

In contrast to the Li+ ion exchange method, the present "molecule stuffing" method does not depend upon the use of temperatures above the strain point. On the contrary, use of temperatures above the strain point can be detrimental and is to be avoided for except brief periods, for it permits rapid viscous flow on the surface that tends to relieve the compression zone which is established by the molecule migration.

The term "strain point," or strain release point, as used herein, is a standard term in the glass art and is defined in American Society for Testing Materials test designation C 162–166 (see 1968 Book of ASTM Standards, Part 13), and can be determined by the method of ASTM designation C 336–64T. It is generally understood to be the temperature at which internal stress is relieved in a few hours. Numerically, it is approximated by the temperature at which the viscosity of the glass is about $10^{14.5}$ poises. The strain points specified herein are those of the glass before treatment.

One important advantage of the new molecular stuffing method in comparison to oil ion exchange methods is that the new method does not require the presence of a large proportion of replaceable sodium ions in the glass network. Thus, lithium ion exchange processes cannot ordinarily be used to much practical advantage with the common commercial borosilicate glasses, because in such glasses the sodium content is low—typically less than 6%—and even if it is replaced, the change does not usefully alter the expansion of the surface zone. As a result, lithium ion exchange treatment does not have much strengthening effect on commercial borosilicates. Similarly, lack of effect is also observed when borosilicate glasses are treated for K+ion exchange; see Journal of the American Ceramic Society, vol. 47, No. 5, pp. 215–219. The present method can be used to strengthen glasses which contain less than 6% alkali and which cannot be substantially strengthened by ion-exchange treatment. In comparison to the present method, if such glasses are treated with ionized salts for ion-exchange, they are strengthened only to a small degree, if at all.

The present evidence indicates that in the present process, essentially no ion exchange takes place; insofar as that mechanism might be detected, it is greatly overbalanced by the stuffing effect, and does not contribute significantly to the strength improvements obtained. Studies show a higher hydroxide level adjacent the surface of a glass article treated in accordance with the new method. The existence of a surface compression zone can be detected under a polarizing microscope.

As previously expressed, the present method requires use of temperatures below the strain point, regardless of whether lithium or potassium hydroxide is employed. This fact substantiates the occurrence of molecular stuffing, for if any significant ion exchange were involved, the use of the lithium source would require temperatures above the strain point. On the contrary, if there is prolonged exposure at temperatures above the strain point, no strengthening is achieved with either lithium or potassium hydroxide, and usually there is an actual reduction in strength.

Useful strengthening compounds include both potassium hydroxide and lithium hydroxide. These may be used alone or in combination, or in sequence, and may be mixed with unreactive compounds to reduce the melting point. Sodium hydroxide has a very severe tendency to corrode or etch most glasses, so that it is not useful except on special glasses that can withstand the etching effect.

In place of the hydroxide, it is possible to use compounds which react or decompose to provide the hydroxide at the site of migration, that is, at the surface of the glass network. One such compound is lithium amide, $LiNH_2$, provided it is used in the presence of a sufficient quantity of water for it to hydrolyze:

$$LiNH_2 + HOH \rightarrow LiOH + NH_3$$

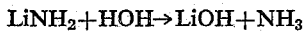

Sufficient water for this reaction to take place is ordinarily present in the atmosphere.

It is believed that the range of glass compositions which can be strengthened by the new method is very wide. As previously stated, the method is not limited just to treatment of glass compositions containing replaceable sodium, such as the conventional soda-lime glasses. On the contrary, this method is especially useful for treating borosilicate glasses, high alumina glasses, and other glasse into the surface layer of which the hydroxide can migrate at the treating conditions used.

Since the rate of migration of molecules from an external source into the glass network increases with temperature, it is ordinarily desirable to use relatively high temperatures within the operating range. However, the treating temperature used should not substantially exceed the strain point of the glass composition, except for momentary or short periods, for example not over one or two minutes. In general, any elevated temperature within the operating range described herein can be used if, for the specific materials involved, it is sufficiently high for molecular migration to occur at a useful rate. Determination of the most useful temperature for a specific application can be determined by a comparison of strengths obtained at different temperatures below the strain point, holding other factors constant. In general, the migration rate is so low below about 600° F. that unnecessarily long treatments are required to achieve a given degree of strengthening. Treatment at 700–900° F. is the most generally useful. While low temperatures do not effect as rapid molecular migration as temperatures nearer the strain point, at temperatures above 900° F. the hydroxide may exhibit a tendency to etch or erode the glass. Where etching or erosion occurs, I have found that this can be minimized or avoided, with most glasses, by operating at 650–750° F.

The molecular migration is accomplished by contacting the glass article with the hydroxide at an elevated temperature below the strain point of the body of the article but sufficiently high that hydroxide molecules can migrate into a surface zone of the article to establish a compression stress relative to the interior of the body. The article must then be cooled, without annealing, to preserve the compression stress. The actual degree of strengthening achieved in a given practice of this process depends upon the concentration of lithium or potassium hydroxide available at the surface of the article, the treating time and temperature cycle, and the composition and shape of the article, and other complexing factors. In general, shorter times are required at higher temperatures to achieve a given strength increase.

The glass article is preferably contacted with the treating composition while the latter is in the liquid state as a melt, as by immersing the article in the liquid hydroxide. However, I have also found that beneficial results can be achieved by contacting the article with vapor of a compound which will supply the hydroxide.

The optimal duration of contacting is dependent on the temperature cycle used, but in general the contacting time must be such that a compression stress is set up in the surface zone relative to the interior of the body; in other words, the migration must be such that the hydroxide molecule content is not uniform throughout the body. The OH level at the surface should be several times the OH level in the interior of the body of the article. The compression band can generally be detected by viewing a fractured treated specimen under a polarizing light microscope, and in any event is evidenced by a strength increase in comparison to similar but unexposed articles. Time periods as short as one minute have proven useful for bath immersion; periods up to an hour or longer may be used where contacting is by vapor.

One important advantage of this method over the ion exchange method is that the new treatment is highly effective on commercial borosilicate glasses, whereas prior methods have only a small or no effect. The borosilicate glasses of commerce typically are characterized by a low coefficient of thermal expansion to begin with, and when strengthened by this process both their resistance to failure from thermal shock and their mechanical strength are markedly increased. For this reason, the new method opens a wide new area of glass fabricating possibilities suitable for strengthening household wares, and industrial and laboratory glassware of borosilicate.

Commercial borosilicate glasses, with which the invention gives surprisingly good results (and which cannot generally be strengthened by ion-exchange processes), in general include about 73–80% silica, 13–16% $B_2O_3$, 3–7% alkali, and up to 3% $Al_2O_3$.

The following examples illustrate several embodiments of the present invention:

EXAMPLE 1

KOH on borosilicate

Small conventional custard cups made of borosilicate glass were treated by immersion in molten potassium hydroxide. The composition of the cups was approximately 76.8% by weight $SiO_2$, 15.2% $B_2O_3$, 5.1% $Na_2O$, 2.1% Al₂O₃ and other trace components totalling an additional 0.8%. The strain point of the glass was 920° F.

The treating bath was prepared by filing a 1,000 ml. beaker with pure potassium hydroxide. The material was melted by heating to 950° F., and when molten the bath temperature was reduced to about 700° F. The cups were contacted with the hydroxide without preheating, by completely immersing them in the molten bath for four minutes, after which they were cooled without annealing and rinsed to remove the dried adherent treating material.

The improvement in the strength of the cups is demonstrated by the fact that treated cups broke when a steel ball weighing 66.5 gms. was dropped on them from an average drop height of 21 inches, whereas the untreated cups broke at an average ball drop of only 7.3 inches—an improvement of 188%.

In another test, similar cups were contacted by immersion for four minutes in the bath at 800° F., in place of the 700° F. treatment for the first bath. Strength improvement was achieved, but it was noted that there was slight erosion of the glass surface of the cups treated at the higher temperature and this detracted somewhat from their appearance. Use of the lower bath temperature obviated this.

EXAMPLE 2

Mixed LiOH/KOH on borosilicate

It presently appears that the best results are obtained by use of a mixture of potassium hydroxide and lithium hydroxide, and that constitutes the preferred embodiment of the invention. The KOH lowers the melting point of the LiOH.

According to this embodiment of the invention KOH and LiOH were mixed in a 8 to 1 molar ratio, equivalent to 112.2 gms. to 11.97 gms. LiOH.H₂O. The mixture was melted at 850° F. to form a liquid bath. Borosilicate rods were treated, of the approximate composition 80% SiO₂, 14% B₂O₃, 4% Na₂O, and 2% Al₂O₃. The rods were immersed, without preheating, in the bath at about 850° F., or well below the strain point of about 970° F. The following strengths were obtained:

| Time treatment, mins.: | Strength, p.s.i. |
| --- | --- |
| 1 | 53,700 |
| 2 | 68,300 |
| 3 | 54,900 |
| 4 | 100,700 |
| 5 | 57,000 |

Before treating, the rods had an average strength of about 20,000 p.s.i.

While it is not known for certain why strength decreased between the four and five minutes treating times, it is postulated that the prolonged stuffing of the surface so changes its composition that the strain point of the local surface composition drops sufficiently, with its increasing alkali content, that the glass surface (as opposed to the body as a whole) is actually above its modified strain point. Where this strength drop-off effect is observed, shorter exposure times or lower temperatures should be used.

Rods of this same borosilicate composition displayed much smaller changes in strength when treated by ion exchange using KNO₃, even in the presence of 5% LiOH. A melt comprising a 7.2:1 mol mix (95% by wt. KNO₃ with 5% LiOH.H₂O) was used to treat the rods at 990° F. No strength better than 31,700 p.s.i. was obtained. This is believed to be due to the low concentration of hydroxide and the probable formation of lithium salts.

In general the presence in the treating bath of a lithium salt, such as lithium nitrate, is undesirable. Although such salts can achieve strengthening by ion exchange at temperatures above the strain point, the present invention requires the use of temperatures below the strain point, at which such materials, if present, tend to cause a strength reduction rather than a strength improvement, and offset or overcomes the strength improvement obtained by use of the lithium hydroxide.

EXAMPLE 3

KOH/LiOH on borosilicate

A mixture of potassium hydroxide and lithium hydroxide was prepared according to the proportions 840 grams KOH to 89.7 grams LiOH.H₂O. This mixture was placed in a 1,000 ml. stainless steel beaker and was melted at 750° F. for thirty minutes. Custard cups having the composition set forth in Example 1 were immersed in the bath for four minutes without preheating. By reason of the cooling effect of the cold cups on the bath, the bath temperature during treatment was in the range of 700–750° F. After treatment the cups were cooled and the adherent bath material was removed from them.

The improvement in the strength of these cups is demonstrated by the fact that treated cups broke when a steel ball weighing 66.5 gms. was dropped on them from an average distance of 13.2 inches, whereas untreated cups broke at an average ball drop of only 6.7 inches.

EXAMPLE 4

Lithium amide vapor on soda-lime

Lithium amide has a higher vapor pressure than LiOH and can advantageously be used to provide vapor which will form the hydroxide for contacting with the surface to be treated. This is done by vaporizing the amide in an air atmosphere.

A two-compartment tube type furnace was employed to vaporize the LiNH₂. Each compartment had a separate heat source and was independently controllable in temperature. The tube was about one inch in diameter, and the ends were open to atmosphere. The lithium amide source was placed in one compartment of the tube and was heated to 1100° F. until equilibrium was established. The rods to be treated had the composition 73.6% by weight SiO₂, 15.2% Na₂O, 0.6% Al₂O₃, 5.7% CaO, 4.0% MgO, 0.4% BaO, 0.4% B₂O₃, 0.6% Al₂O₃. Rods were placed in the second chamber of the furnace and maintained at 900° F., or below the strain point of 914° F. Ammonia vapors were detectable in the area of the tube, indicating that the hydroxide-forming reaction with water was taking place. The rods were so contacted for 20 minutes. After cooling, they showed a surface compression layer under a polarizing microscope, and had a strength of 28,000 p.s.i. in comparison to the 20,500 p.s.i. strength of untreated rods.

As a comparison, when similar rods were held at a treating temperature of 1140° F. (which is above the strain point) for a twenty minute time period, a strength decrease to 14,400 p.s.i. was observed, and a tension bond on the surface was found under the microscope.

If LiNH₂ is used in an artificially dry atmosphere, for example in dry nitrogen, it is not converted to the hydroxide, and strengthening is not achieved below the strain point.

What is claimed is:

1. A method of increasing the strength of a glass article which consists essentially of the steps of,
    contacting the surface of said article with at least one hydroxide of the class consisting of LiOH and KOH, at an elevated temperature below the strain point of the body of said article but sufficiently high that molecules of said hydroxide can migrate into said article, for a sufficient period of time that molecules of said hydroxide migrate into a surface zone of said article and establish a compression stress in said surface zone relative to the interior of the body of said article, but without causing significant etching of said surface,
    and cooling said article without removing said compression stress.

2. The method of claim 1 wherein said contacting is carried out at a temperature which is greater than about 650° C.

3. The method of claim 1 wherein said contacting is carried out by immersing said article in a liquid melt of said hydroxide.

4. The method of claim 1 wherein said contacting is carried out by exposing said article to vapor of said hydroxide.

5. The method of claim 1 wherein said hydroxide is a mixture of LiOH and KOH.

6. The method of claim 1 wherein said contacting is carried out by immersing said article in a melt of KOH.

7. The method of claim 6 wherein said contacting takes place at a melt temperature in the range of 700–900° F.

8. The method of claim 1 wherein said article is a borosilicate glass including approximately 73–80% by weight $SiO_2$, 13–16% $B_2O_3$, 3–7% alkali, and up to 3% $Al_2O_3$.

9. The method of claim 1 wherein said article is a soda-lime glass.

10. The method of claim 1 wherein said hydroxide is formed by vaporizing $LiNH_2$ in the presence of water vapor, and said article is contacted with the products of a vapor phase reaction between said $LiNH_2$ and water vapor.

11. A method of increasing the strength of a glass article which contains less than about 6% alkali and which is not substantially strengthened by ion-exchange treatment, said method consisting essentially of the steps of,
contacting the surface of said article with at least one hydroxide of the class consisting of LiOH and KOH, at an elevated temperature below the strain point of the body of said article for a sufficient period of time to establish a compression stress in a surface zone of said article relative to the interior of the body of said article but without significantly etching said surface,
and cooling said article without removing said compression stress.

12. A method of increasing the strength of a glass article which consists essentially of the steps of,
immersing said article in a melt containing as its essential ingredient at least one hydroxide of the class consisting of LiOH and KOH, said melt being at a temperature above about 600° F. but below the strain point of said glass article,
maintaining said article in said melt for a sufficient period of time that a compression stress is established in a surface zone of said article relative to the interior of the body of said article,
the temperature and time conditions of said immersing being insufficient to each the glass surface visibly, and cooling said article without removing said compression stress.

13. The method of claim 12 wherein said hydroxide is KOH.

14. The method of claim 12 wherein said hydroxide is a mixture of LiOH and KOH.

15. The method of claim 12 wherein said hydroxide is substantially a mixture of LiOH and KOH.

16. The method of claim 12 wherein said article is a borosilicate glass including approximately 73–80% by weight $SiO_2$, 13–16% $B_2O_3$, 3–7% alkali, and up to 3% $Al_2O_3$.

17. A method of increasing the strength of a glass article which contains less than about 6% alakli and which is not significantly strengthened by ion-exchange treatment, said method consisting essentially of the steps of,
contacting the surface of said article with lithium hydroxide at an elevated temperature below the strain point of the body of said article, for a sufficient period of time to establish a compression stress in a surface zone of said article relative to the interior of the body of said article,
terminating said contacting before said surface is significantly etched,
and cooling said article without removing said compression stress.

18. The method of claim 17 wherein said contacting is carried out by exposing said article to vapor generated by heating lithium amide in air having sufficient moisture content that the amide vapor is converted to lithium hydroxide.

References Cited
UNITED STATES PATENTS

| | | | |
|---|---|---|---|
| 2,143,796 | 1/1939 | Phillips | 65—114 X |
| 2,779,136 | 1/1957 | Hood et al. | 65—30 X |
| 3,505,049 | 4/1970 | Plumat | 65—30 |
| 3,395,999 | 8/1968 | Lewek | 65—116 X |
| 3,441,398 | 4/1969 | Hess | 65—116 X |
| 3,524,737 | 8/1970 | Doyle et al. | 65—30 |

OTHER REFERENCES

Vakhrameev, V. I. and Lesnikov, A. K. and Evstropev, K. S. "Increasing the Thermal Stability of Glasses by Treatment in Alkali Solution."
Abstract, No. 1260, Glass Technology, vol. 10, No. 6, p. 110A, December 1969.

FRANK W. MIGA, Primary Examiner

U.S. Cl. X.R.

65—3, 116; 117—124